United States Patent
Yoo et al.

(10) Patent No.: US 11,225,209 B2
(45) Date of Patent: Jan. 18, 2022

(54) SYSTEM AND METHOD FOR CHARGING OF BATTERY OF SEAT

(71) Applicants: HYUNDAI MOTOR COMPANY, Seoul (KR); KIA MOTORS CORPORATION, Seoul (KR); Daechang Seat Co., Ltd—Dongtan, Hwaseong-si (KR)

(72) Inventors: So Young Yoo, Suwon-si (KR); Doo Ri Kim, Goyang-si (KR); Hyung Jin Park, Anyang-si (KR); Yo Han Kim, Ansan-si (KR); Dong Hoon Lee, Seoul (KR); Seon Chae Na, Yongin-si (KR); Sang Uk Yu, Seoul (KR); Byung Yong Choi, Hwaseong-si (KR); Sang Young Park, Hwaseong-si (KR); Tae Hong Han, Seoul (KR)

(73) Assignees: HYUNDAI MOTOR COMPANY, Seoul (KR); KIA MOTORS CORPORATION, Seoul (KR); DAECHANG SEAT CO., LTD-DONGTAN, Hwaseong-si (KR)

( * ) Notice: Subject to any disclaimer, the term of this patent is extended or adjusted under 35 U.S.C. 154(b) by 0 days.

(21) Appl. No.: 16/997,127

(22) Filed: Aug. 19, 2020

(65) Prior Publication Data
US 2021/0178989 A1 Jun. 17, 2021

(51) Int. Cl.
*B60R 16/027* (2006.01)
*B60N 2/90* (2018.01)
(Continued)

(52) U.S. Cl.
CPC .......... *B60R 16/027* (2013.01); *B60N 2/0232* (2013.01); *B60N 2/0244* (2013.01);
(Continued)

(58) Field of Classification Search
CPC ....... B60R 16/027; B60R 16/033; B60N 2/90; B60N 2/0232; B60N 2/0244; B60N 2/06; B60N 2002/981; B60N 2002/0272
See application file for complete search history.

(56) References Cited

U.S. PATENT DOCUMENTS

| 5,944,131 A | 8/1999 | Schaffner et al. |
| 6,105,706 A | 8/2000 | Cooper |
(Continued)

FOREIGN PATENT DOCUMENTS

| EP | 3546280 A1 | 10/2019 |
| JP | 2010-105527 A | 5/2010 |
(Continued)

OTHER PUBLICATIONS

Extended European Search Report dated Mar. 2, 2021 issued in European Patent Application No. 20191762.2.
(Continued)

*Primary Examiner* — Philip F Gabler
(74) *Attorney, Agent, or Firm* — Morgan, Lewis & Bockius LLP

(57) ABSTRACT

A system and method of charging a battery of a seat in which a seat battery for supplying power to an additional device as well as movement of the position of the seat is positioned in the seat, and thus, even if the position of the seat is changed, it is possible to supply continuous power to an additional device included in the seat. In addition, the position of the seat is moved to charge the seat battery, and the seat battery provided in the seat is charged in consideration of whether the passenger sits on the seat, the state of charge of the battery of the vehicle, or the like, thereby smoothly charging the seat battery.

10 Claims, 6 Drawing Sheets

(51) Int. Cl.
  *B60N 2/02* (2006.01)
  *B60N 2/06* (2006.01)
  *B60R 16/033* (2006.01)

(52) U.S. Cl.
  CPC ............... *B60N 2/06* (2013.01); *B60N 2/90* (2018.02); *B60R 16/033* (2013.01); *B60N 2002/0272* (2013.01); *B60N 2002/981* (2018.02)

(56) References Cited

U.S. PATENT DOCUMENTS

| | | | |
|---|---|---|---|
| 7,207,403 B2 | 4/2007 | Grymko et al. | |
| 7,614,699 B2 | 11/2009 | Torres et al. | |
| 10,836,332 B2* | 11/2020 | Yamamoto | B60N 2/06 |
| 10,926,668 B2* | 2/2021 | Line | B60R 16/023 |
| 2011/0162896 A1 | 7/2011 | Gillett | |
| 2016/0031507 A1 | 2/2016 | Neugebauer et al. | |
| 2019/0260238 A1* | 8/2019 | Cho | B60N 2/5685 |
| 2019/0299817 A1* | 10/2019 | Faltin | B60N 2/0715 |
| 2020/0016997 A1 | 1/2020 | Sato et al. | |
| 2020/0189511 A1* | 6/2020 | Ricart | B60R 21/207 |
| 2020/0290534 A1* | 9/2020 | Hemmelgarn | B60N 2/18 |
| 2021/0178990 A1* | 6/2021 | Yoo | B60N 2/5678 |

FOREIGN PATENT DOCUMENTS

| | | |
|---|---|---|
| KR | 10-1518647 B1 | 11/2015 |
| KR | 10-2016-0043303 A | 4/2016 |
| WO | 10-2015-0130542 A | 11/2015 |
| WO | 2018/221977 A1 | 12/2018 |

OTHER PUBLICATIONS

U.S. Office Action dated Aug. 2, 2021, issued in corresponding U.S. Appl. No. 16/997,488.

* cited by examiner

SYSTEM AND METHOD FOR CHARGING OF BATTERY OF SEAT

CROSS-REFERENCE TO RELATED APPLICATION

The present application claims the benefit of priority to Korean Patent Application No. 10-2019-0167279, filed on Dec. 13, 2019 in the Korean Intellectual Property Office, the disclosure of which is incorporated herein by reference.

TECHNICAL FIELD

The present disclosure relates to a system and method of charging a battery of a seat, and more particularly, to a system and method of charging a battery of a seat in which a battery for supply power to an additional device as well as movement of the position of the seat is provided in a seat and the battery provided in the seat is charged in consideration of various conditions.

BACKGROUND

A seat of a vehicle allows a driver or a passenger to comfortably sit thereon to prevent them from being tired even in a long distance travel, and such a seat supports the weight of a passenger and broadly includes a seat cushion that is slidably installed forward and backward on a bottom surface of an indoor space, and a seatback that is rotatably installed at a predetermined angle with respect to the seat cushion to support the back of the passenger.

A passenger compartment of a vehicle requires various spaces in order to get people of different body sizes or articles into the vehicle. Recently, as autonomous vehicles have been developed, a seat is configured to be moved to a different position or to be rotated in a direction of 360 degrees inside the vehicle.

However, currently, a seat of a vehicle includes a motor for moving the seat, and as various seat functions such as hot wires, ventilation, or massage are additionally installed, power needs to be supplied to the seat. However, conventionally, as power is supplied to various devices of the seat using wiring, limitation on seat movement occurs.

The information disclosed in the Background section above is to aid in the understanding of the background of the present disclosure, and should not be taken as acknowledgement that this information forms any part of prior art.

SUMMARY

Therefore, the present disclosure has been made in view of the above problems, and it is an object of the present disclosure to provide a system and method of charging a battery of a seat in which a battery for supply power to an additional device as well as movement of the position of the seat is provided in a seat and the battery provided in the seat is charged in consideration of various conditions.

In accordance with an aspect of the present disclosure, the above and other objects can be accomplished by the provision of a system for charging a battery of a seat, which includes a seat battery installed in the seat movable on a seat rail, a charge connector that is installed on the seat rail and is electrically connected to the seat battery to supply power of a vehicle battery to the seat battery when the seat is moved to a charge position, and a controller configured to control a position of the seat, to receive information on a state of charge of the seat battery, and to move the seat to the charge position to electrically connect the seat battery and the charge connector to each other when the state of charge of the seat battery is less than or equal to a preset capacity.

The seat battery and the controller may be installed in a housing disposed below the seat and may be configured as one integrated module.

A battery connector that is electrically connected to the seat battery may be included in the housing, and may be positioned to be electrically connected to the charge connector when the seat is moved forward or backward to a respective maximum seat position on the seat rail.

The charge connector may be positioned to be connected to the battery connector when the seat is moved forward or backward to the respective maximum seat position on the seat rail.

The controller may additionally receive information on whether a passenger sits on the seat, and may perform control to move the seat to the charge position when the state of charge of the seat battery is less than or equal to a preset capacity and the passenger does not sit on the seat.

The controller may determine whether the state of charge of the seat battery is less than or equal to a preset capacity limit when the passenger sits on the seat, and may perform control to move the seat to the charge position when the state of charge of the seat battery is less than or equal to the capacity limit.

When controlling the seat to be moved to the charge position as the state of charge of the seat battery is less than or equal to a capacity limit, the controller may transmit a warning message or a warning sound to a passenger through a warning transmitter.

When the state of charge of the seat battery is greater than a preset capacity limit while the passenger sits on the seat, the controller may perform control to move the seat to a charge position upon receiving a charge command based on manipulation of a manipulator of a passenger.

The controller may additionally receive information on a position of the seat and information on whether the battery of the vehicle is charged, and when the battery of the vehicle is not charged and the seat is positioned at the charge position, the controller may set a limit to charge the seat battery by a preset state of charge.

When the battery of the vehicle is charged and the seat is positioned at the charge position, the controller may fully charge the seat battery.

In accordance with another aspect of the present disclosure, a method of charging a battery of a seat including a seat battery installed in the seat and configured to be charged by receiving vehicle power, and a charge connector that is installed on a seat rail and is electrically connected to the seat battery to supply the vehicle power to the seat battery when the seat is moved to a charge position, the method including a battery check operation of recognizing a state of charge of the seat battery, and a charge determination operation of electrically connecting the seat battery and the charge connector to each other to charge the seat battery by moving the seat to a charge position when the state of charge of the seat battery, which is collected through the battery check operation, is less than or equal to a preset capacity.

The method may further include a sitting check operation of additionally receiving information on whether a passenger sits on the seat, wherein the charge determination operation may include moving the seat to the charge position when the state of charge of the seat battery is less than or equal to a preset capacity and the passenger does not sit on the seat.

The charge determination operation may include additionally determining whether the state of charge of the seat battery is less than or equal to a preset capacity limit when the passenger sits on the seat, and performing control to move the seat to the charge position when the state of charge of the seat battery is less than or equal to the capacity limit.

The charge determination operation may further include a warning operation of transmitting a warning message or a warning sound to the passenger when controlling the seat to be moved to the charge position as the state of charge of the seat battery is less than or equal to a capacity limit.

The charge determination operation may include checking a charging command input based on manipulation of a manipulator of the passenger and performing control to move the seat to the charge position when the state of charge of the seat battery is greater than a preset capacity limit while the passenger sits on the seat.

The method may further include an additional check operation of recognizing information on the position of the seat and information on whether the battery of the vehicle is charged, wherein the charge determination operation may include setting a limit to charge the seat battery by a preset state of charge when the battery of the vehicle is not charged and the seat is positioned at the charge position.

The charge determination operation may include fully charging the seat battery when the battery of the vehicle is charged and the seat is positioned at the charge position.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, a system and method for charging a battery of a seat according to various exemplary embodiments of the present disclosure will be described with reference to the accompanying drawings.

Figure 1:
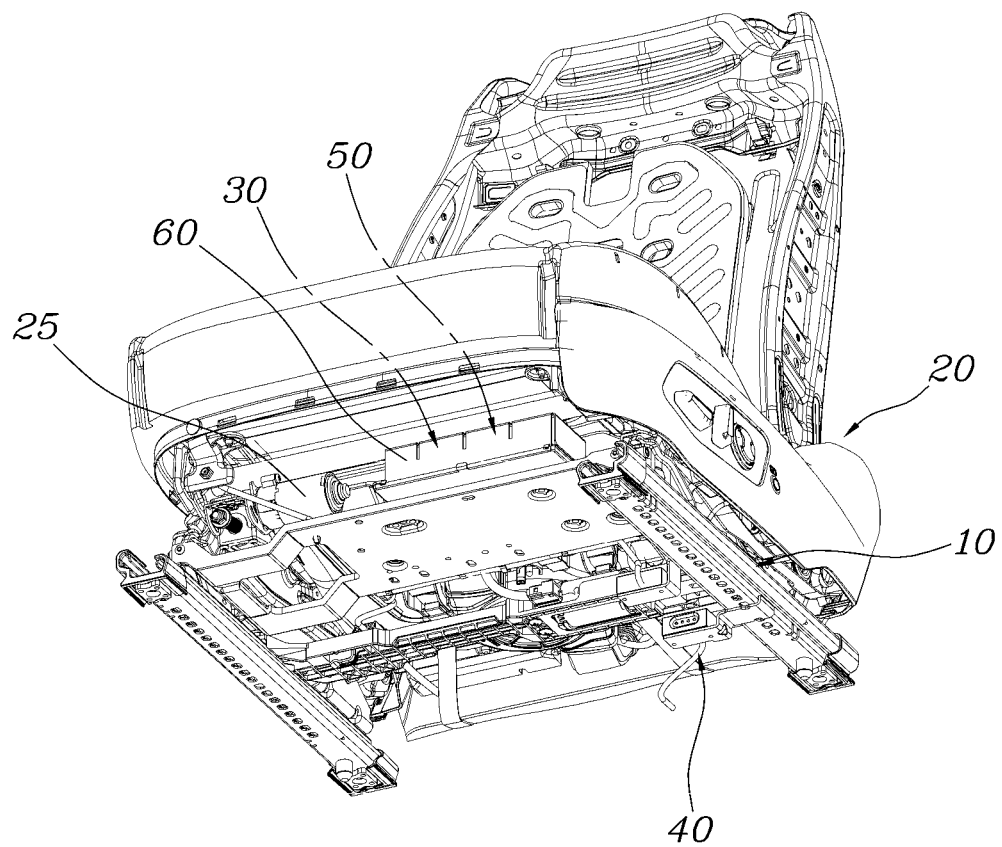
FIG. 1 is a diagram showing a seat apparatus of a battery charging system of a seat according to one exemplary embodiment of the present disclosure.
Figure 2:
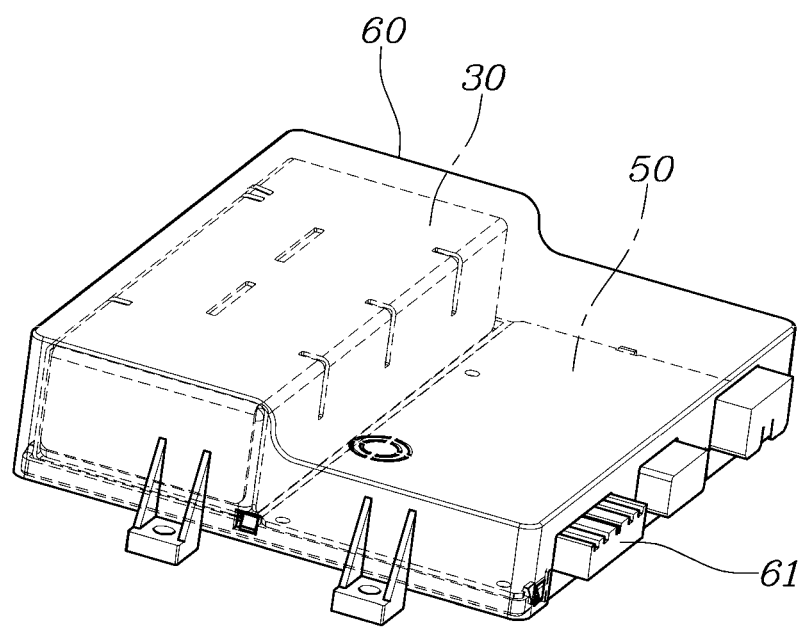
FIGS. 2 and 3 are diagrams for explaining the seat apparatus illustrated in FIG. 1 according to one exemplary embodiment of the present disclosure.
Figure 3:
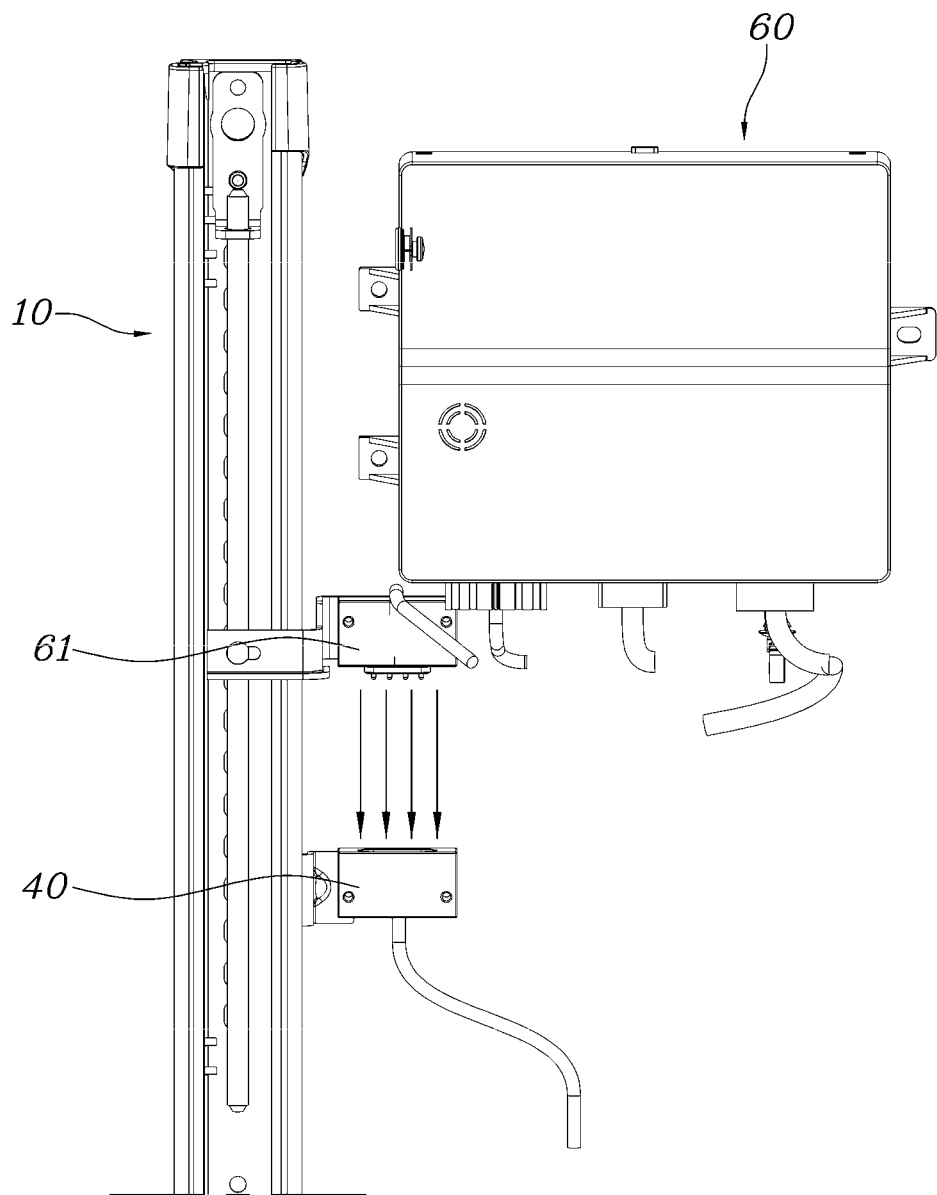
Figure 4:
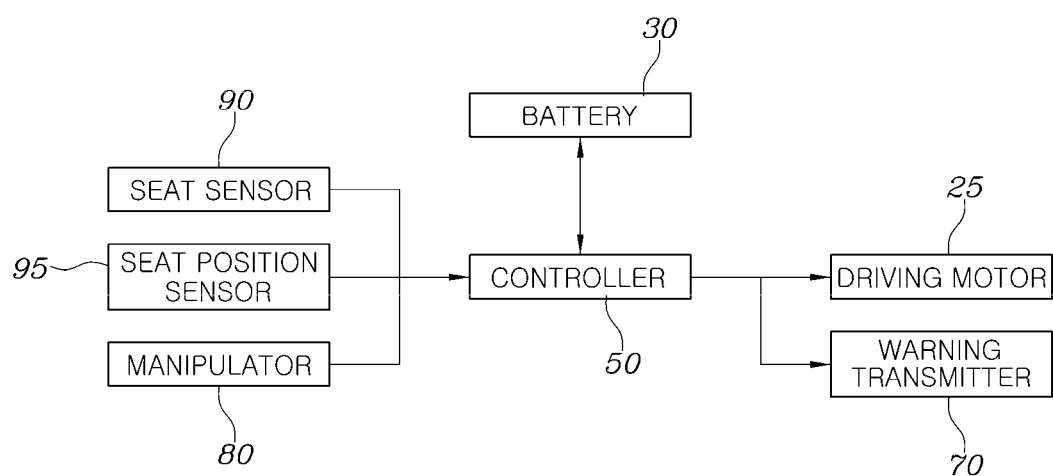
FIG. 4 is a diagram showing the configuration of a brake force control system of a vehicle according to one exemplary embodiment of the present disclosure.
Figure 5:
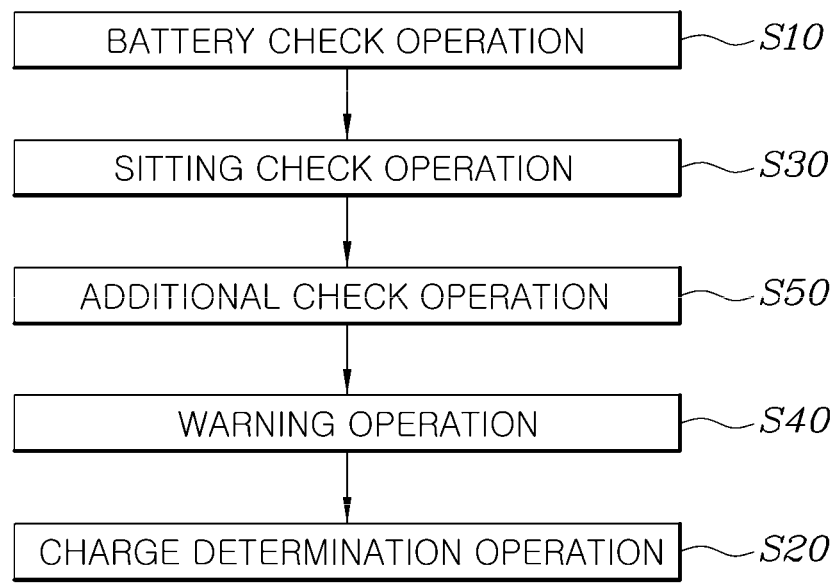
FIGS. 5 and 6 are flowcharts of a method of controlling brake force of a vehicle according to one exemplary embodiment of the present disclosure.
Figure 6:
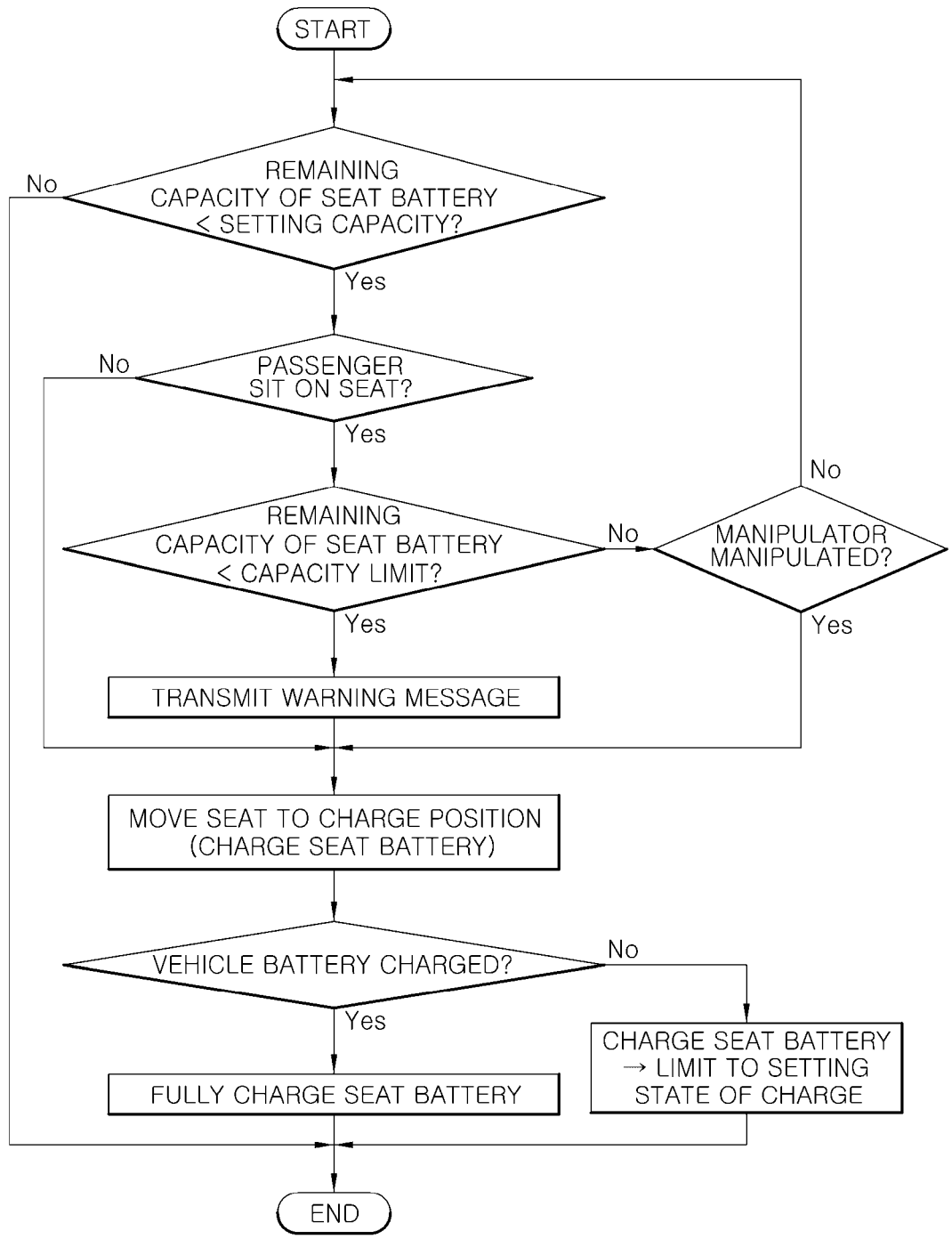

FIG. 1 is a diagram showing a seat apparatus of a battery charging system of a seat according to one exemplary embodiment of the present disclosure. FIGS. 2 and 3 are diagrams for explaining the seat apparatus illustrated in FIG. 1 according to one exemplary embodiment of the present disclosure. FIG. 4 is a diagram showing the configuration of a brake force control system of a vehicle according to one exemplary embodiment of the present disclosure. FIGS. 5 and 6 are flowcharts of a method of controlling brake force of a vehicle according to one exemplary embodiment of the present disclosure.

As shown in FIGS. 1 to 4, the battery charging system of the seat according to one exemplary embodiment of the present disclosure may include a seat battery 30 installed in a seat 20 that is moveable on a seat rail 10, a charge connector 40 that is installed on the seat rail 10, and is electrically connected to the battery 30 and supplies battery power of the vehicle when the seat 20 is moved to a charge position, and a controller 50 configured to control a position of the seat 20, to receive information on the state of charge of the battery 30, and to perform control to electrically connect the battery 30 and the charge connector 40 to each other by moving the seat 20 to a charge position when the state of charge of the battery 30 is less than or equal to a preset capacity.

As such, according to one exemplary embodiment of the present disclosure, the battery charging system may include the seat battery 30 installed in the seat 20, the charge connector 40 installed on the seat rail 10, and the controller 50 configured to control the position of the seat 20 and charge of the seat battery 30.

Here, the seat 20 may be moved on the seat rail 10 when a driving motor 25 is operated, and the controller 50 may change the position of the seat 20 through control of the driving motor 25. A sliding structure for moving the seat 20 is moved on the seat rail 10 is a generally applied technology, and thus, a detailed description thereof is omitted herein.

The seat battery 30 may include the driving motor 25 that is installed in the seat 20 and moves the position of the seat 20 using charged power, and may be configured to supply power to various additional devices of the seat. The battery 30 may be provided independently upon the seat 20 without connection with separate external power and may be charged with power.

The charge connector 40 may be installed on the seat rail 10 and may be provided to supply power transferred from the battery of the vehicle to the seat battery 30 installed in the seat 20. The charge connector 40 may be fixedly installed on the seat rail 10, and as the seat 20 is moved, power transferred from the battery of the vehicle may be transferred to the seat battery 30 when the seat 20 is positioned to face the seat battery 30, thereby charging the seat battery 30.

Here, the seat battery 30 and the controller 50 may be installed in a housing 60 provided below the seat 20 to configure one integrated module. As such, the controller 50 including the seat battery 30 and a printed circuit board (PCB) may be installed together inside the housing 60 to configure one integrated module, and thus, an installation space may be reduced in a downward direction of the seat 20, and the controller 50 and the seat battery 30 may be electrically connected to each other without a separate wire for connection therebetween. The housing 60 may be formed of a steel material for protecting the seat battery 30 and the controller 50 from external shocks.

The housing 60 may include a battery connector 61 that is electrically connected to the seat battery 30, and the battery connector 61 may be disposed to be electrically connected to the charge connector 40 when the seat 20 is moved forward or backward to a respective maximum seat position on the seat rail 10. Thus, the charge connector 40 may be positioned to be connected to the battery connector 61 when the seat 20 is moved forward or backward to the maximum on the seat rail 10.

Here, the battery connector 61 and the charge connector 40 may include a pogo pin or a 4-pin to be electrically connected to each other, and the battery connector 61 connected to the seat battery 30 may protrude out of the housing 60 to be electrically connected to the charge connector 40.

The battery connector 61 and the charge connector 40 may be connected to each other when the seat 20 is moved forward or backward to the maximum, and a passenger who sits on the seat 20 may be capable of recognizing a charging situation of the seat battery 30. In addition, the seat battery 30 may be charged when the seat 20 is moved forward or backward to the maximum, thereby preventing the seat battery 30 from being repeatedly charged due to a frequent position change of the seat.

As such, according to one exemplary embodiment of the present disclosure, the seat battery 30 and the controller 50 which configure one integrated module through the housing 60 may be provided below the seat 20, and thus, even if a position of the seat 20 is changed, it may be possible to supply continuous power to an additional device included in the seat 20. When the seat 20 is moved forward or backward to the maximum, the seat battery 30 may be charged.

The aforementioned controller according to one exemplary embodiment of the present disclosure may control the position of the seat 20 depending on the state of charge of the seat battery 30 and may charge the seat battery 30.

That is, the controller 50 may be provided to control the position of the seat 20, and receive information on the state of charge of the seat battery 30, and may perform control to electrically connect the seat battery 30 and the charge connector 40 to each other by moving the seat 20 to a charge position when the state of charge of the seat battery 30 is less than or equal to a preset capacity.

As such, the controller 50 may receive information on residual capacity, voltage, or the like of the seat battery 30 to recognize the state of the charge of the seat battery 30, and when the state of charge of the seat battery 30 is less than or equal to a preset capacity, the controller 50 may electrically connect the seat battery 30 and the charge connector 40 to each other to charge the seat battery 30 by moving the seat 20 to a charge position. Here, the charge capacity of the seat battery 30 may be preset depending on electric energy required by a seat additional device, and for example, may be 40% of the total capacity of the seat battery 30.

As such, when the state of charge of the seat battery is less than or equal to a preset capacity, the controller 50 may perform control to move the seat 20 to a charge position and may charge the seat battery 30.

The controller 50 may additionally receive information on whether a passenger sits on a seat, and may perform control to move the seat 20 to a charge position when the state of charge of the seat battery 30 is less than or equal to a preset capacity and the passenger does not sit on the seat.

The controller 50 may receive information on whether the passenger sits on the seat through a seat sensor 90, and in the case of the seat sensor 90, the controller 50 may detect a pressure of the passenger who sits on the seat 20 or may check whether a seatbelt is buckled to check whether the passenger sits on the seat. In addition, whether the passenger sits on the seat may also be checked using infrared rays or a change in body temperature.

As such, when checking whether the passenger sits on the seat, the controller 50 may perform control to move the seat 20 to a charge position and may charge the seat battery 30 when the state of charge of the seat battery 30 is less than or equal to a preset capacity and the passenger does not sit on the seat.

That is, when the state of charge of the seat battery 30 is less than or equal to a preset capacity, the seat 20 may be moved to charge the seat battery 30, and when the seat 20 is forcibly moved forward or backward while the passenger sits on the seat 20, the passenger may experience a sense of unfamiliarity and inconvenience. Thus, the controller 50 may move the seat 20 to charge the seat battery 30 when the passenger does not sit on the seat 20.

The controller 50 may determine whether the state of charge of the seat battery 30 is less than or equal to a preset capacity limit while the passenger sits on the seat 20, and when the state of charge of the seat battery 30 is less than or equal to the capacity limit, the controller 50 may perform control to move the seat 20 to a charge position.

Here, the capacity limit preset in the controller 50 may be preset depending on electric energy required by a seat additional device, and for example, may be less than or equal to 5% of the total capacity of the seat battery 30. That is, with regard to the capacity limit, at a time point when the remaining capacity of the seat battery 30 becomes less than the capacity limit, driving of a seat additional device including movement of the seat 20 is immediately disabled, and in this regard, when the state of charge of the seat battery 30 is less than or equal to the capacity limit, the controller 50 may move the seat 20 to a charge position to charge the seat battery 30.

In this case, as the state of charge of the seat battery 30 is less than or equal to the capacity limit, the controller 50 may transmit a warning message or a warning sound to the passenger through a warning transmitter 70 when performing control to move the seat 20 to a charge position.

Here, the warning transmitter 70 may include a display or a speaker, and may transmit the warning message or the warning sound to allow the passenger who sits on the seat 20 to recognize that the seat 20 is supposed to be moved as the seat battery 30 of the seat 20 is insufficient.

That is, as the state of charge of the seat battery 30 is less than or equal to the capacity limit, when the controller 50 performs control to move the seat 20 to a charge position, the passenger who sits on the seat 20 may experience inconvenience due to sudden movement of the seat 20, and thus, a signal corresponding to movement of the seat 20 may be transferred to the passenger through the warning transmitter 70, thereby removing a factor that causes the passenger to experience inconvenience.

When the state of charge of the seat battery 30 is greater than the preset capacity limit while the passenger sits on the seat, the controller 50 may perform control to move the seat 20 to a charge position upon receiving a charge command based on manipulation of a manipulator 80 of the passenger.

In detail, when the state of charge of the seat battery 30 is less than or equal to the setting capacity and is greater than the capacity limit, if intent based on manipulation of the manipulator 80 of the passenger is applied, the seat battery 30 of the seat 20 may be charged. Here, the manipulator 80 may be a switch for moving the seat 20 to a charge position and may move the seat 20 to a charge position irrespective of charge of the seat battery 30.

As such, when the state of charge of the seat battery is less than or equal to the setting capacity and is greater than the capacity limit, if intent of charging the seat battery 30 based on manipulation of the manipulator 80 of the passenger is applied, the controller 50 may move the seat 20 to a charge position to charge the seat battery 30.

As such, when the state of charge of the seat battery is less than or equal to the setting capacity, if passenger's intent of charging the seat battery 30 is not applied, the current state may be maintained to prevent the passenger who sits on the seat 20 from experiencing inconvenience.

The controller 50 may receive information on the position of the seat 20 and information on whether a battery of a vehicle is charged, and when the battery of the vehicle is not charged and the seat 20 is positioned at a charge position, the controller 50 may set a limit to charge the seat battery 30 by a preset state of charge.

As such, the controller 50 may receive information on the position of the seat 20 from a seat position sensor 95 and may measure a battery voltage of the vehicle to receive information on whether the battery of the vehicle is charged. In addition, a state of charge preset in the controller 50 may correspond to a degree for smoothly performing movement of the seat 20 and driving of seat additional devices, and for example, may be set to a level of 60% of the total state of charge of the seat battery 30.

When the remaining capacity of the battery of the vehicle is disregarded and the seat battery 30 of the seat 20 is charged, there is a problem in that the battery of the vehicle is discharged. Thus, when the battery of the vehicle is not charged and the seat 20 is positioned at a charge position, the controller 50 may set a limit to charge the seat battery 30 by a preset state of charge, thereby preventing the battery of the vehicle from being discharged as the seat battery 30 of the seat 20 is charged.

When the battery of the vehicle is charged and the seat 20 is positioned at a charge position, the controller 50 may fully charge the seat battery 30. That is, when the battery of the vehicle is charged, even if the seat battery of the seat 20 is charged using the battery of the vehicle, the remaining capacity of the battery of the vehicle may be sufficiently maintained. Thus, when the battery of the vehicle is charged, the controller 50 may fully charge the seat battery 30 if the seat 20 is positioned at a charge position and the seat battery 30 of the seat 20 is charged.

A charge method of the seat battery 30 of the seat 20 according to one exemplary embodiment of the present disclosure will be described below. Here, the seat battery 30 of the seat 20 may be provided in the seat 20 and may receive power to be charged, and the charge connector 40 may be provided on the seat rail 10 and may be electrically connected to the seat battery 30 to supply vehicle power to the seat battery 30 when the seat 20 is moved to a charge position. The charge method of the seat battery 30 of the seat 20 according to one exemplary embodiment of the present disclosure may be performed by the aforementioned structure.

In detail, as shown in FIGS. 5 and 6, the charge method of the seat battery 30 of the seat 20 may include a battery check operation S10 of recognizing the state of charge of the seat battery 30, and a charge determination operation S20 of electrically connecting the seat battery 30 and the charge connector 40 to each other to charge the seat battery 30 by moving the seat 20 to a charge position when the state of charge of the seat battery 30, which is collected through the battery check operation S10, is less than or equal to the preset capacity.

As such, in the charge determination operation S20, when the state of charge of the seat battery 30 is less than or equal to the setting capacity, the seat 20 may be moved to a charge position, and thus, the seat battery 30 and the charge connector 40 may be electrically connected to each other to charge the seat battery 30. Here, the setting capacity may be preset depending on electric energy required by an additional device of the seat 20, and for example, may be 40% of the total capacity of the seat battery 30.

The charge method may further include a sitting check operation S30 for additionally receiving information on whether the passenger sits on a seat, and in the charge determination operation S20, when the state of charge of the seat battery 30 is less than or equal to a preset capacity, the seat 20 may be moved to a charge position while the passenger does not sit on the seat.

That is, when the state of charge of the seat battery 30 is less than or equal to a preset capacity, the seat 20 needs to be moved to charge the seat battery 30, and in this regard, when the seat 20 is forcibly moved forward or backward while the passenger sits on the seat 20, the passenger may experience a sense of unfamiliarity and inconvenience. Thus, when the passenger is not checked to sit on the seat 20 through the sitting check operation S30, the seat 20 may be moved to charge the seat battery 30 in the charge determination operation S20.

In the charge determination operation S20, when the passenger sits on the seat, whether the state of charge of the seat battery 30 is less than or equal to the preset capacity limit may be determined, and when the state of charge of the seat battery 30 is less than or equal to the capacity limit, the seat 20 may be controlled to be moved to a charge position.

Here, with regard to the capacity limit, at a time point when the remaining capacity of the seat battery 30 becomes less than the capacity limit, driving of a seat additional device including movement of the seat 20 is immediately disabled, and in this regard, when the state of charge of the seat battery 30 is less than or equal to the capacity limit, the controller 50 may move the seat 20 to a charge position to charge the seat battery 30.

In the charge determination operation S20, the charge method may further include a warning operation S40 of transmitting a warning message or a warning sound to the passenger when the seat 20 is controlled to be moved to a charge position as the state of charge of the seat battery 30 is less than or equal to the capacity limit.

Here, the warning message or the warning sound may be transmitted through a display or a speaker, and in this regard, the warning message or the warning sound may be transmitted to allow the passenger who sits on the seat 20 to recognize that the seat 20 is supposed to be moved as the seat battery 30 of the seat 20 is insufficient.

As such, as the state of charge of the seat battery 30 is less than or equal to the capacity limit, when the seat 20 is moved to a charge position, the passenger who sits on the seat 20 may experience inconvenience due to sudden movement of the seat 20, and thus, the warning operation S40 may be performed to transfer a signal corresponding to movement of the seat 20 to the passenger, thereby removing a factor that causes the passenger to experience inconvenience.

In the charge determination operation S20, when the state of charge of the seat battery 30 is greater than the preset capacity limit while the passenger sits on the seat, a charge command input based on manipulation of the manipulator 80 of the passenger may be checked, and the seat 20 may be controlled to be moved to a charge position upon receiving the charge command.

In detail, when the state of charge of the seat battery 30 is less than or equal to the setting capacity and is greater than the capacity limit, if passenger intent is applied, the seat battery 30 of the seat 20 may be charged. Here, the manipulator 80 may be a switch for moving the seat 20 to a charge position and may move the seat 20 to a charge position irrespective of charge of the seat battery 30.

As such, when the state of charge of the seat battery is less than or equal to the setting capacity and is greater than the capacity limit, if intent of charging the seat battery 30 based on manipulation of the manipulator 80 of the passenger is applied, the seat 20 may be moved to a charge position to charge the seat battery 30.

The charge method may further include an additional check operation S50 of recognizing information on the position of the seat 20 and information on whether the battery of the vehicle is charged, and in the charge determination operation S20, when the battery of the vehicle is charged and the seat 20 is positioned at a charge position, a limit may be set to charge the seat battery 30 by a preset state of charge.

When the remaining capacity of the battery of the vehicle is disregarded and the seat battery 30 of the seat 20 is charged, there is a problem in that the battery of the vehicle is discharged. Thus, when checking that the battery of the vehicle is not charged and the seat 20 is positioned at a charge position through the additional check operation S50, a limit may be set to charge the seat battery 30 by a preset state of charge through the charge determination operation S20, thereby preventing the battery of the vehicle from being discharged as the seat battery 30 of the seat 20 is charged.

When the battery of the vehicle is not charged and the seat 20 is positioned at a charge position in the charge determination operation S20, the seat battery 30 may be fully charged.

That is, when the battery of the vehicle is charged, even if the seat battery 30 of the seat 20 is charged using the battery of the vehicle, the remaining capacity of the battery of the vehicle may be sufficiently maintained. Thus, in the charge determination operation, when the battery of the vehicle is charged, the seat battery 30 may be fully charged if the seat 20 is positioned at a charge position and the seat battery 30 of the seat 20 is charged.

In the system and method for charging a seat battery with the aforementioned configuration, the seat battery 30 for supplying power to an additional device as well as movement of the position of the seat 20 may be positioned in the seat 20, and thus, even if the position of the seat 20 is changed, it may be possible to supply continuous power to an additional device included in the seat 20. In addition, the position of the seat 20 may be moved to charge the seat battery 30, and the seat battery 30 provided in the seat 20 may be charged in consideration of whether the passenger sits on the seat, the state of charge of the battery of the vehicle, or the like, thereby smoothly charging the seat battery 30.

In the system and method for charging a battery of a seat with the aforementioned configuration, the seat battery for supplying power to an additional device as well as movement of the position of the seat may be positioned in the seat, and thus, even if the position of the seat is changed, it may be possible to supply continuous power to an additional device included in the seat. In addition, the position of the seat may be moved to charge the seat battery, and the seat battery provided in the seat may be charged in consideration of whether the passenger sits on the seat, the state of charge of the battery of the vehicle, or the like, thereby smoothly charging the seat battery.

It will be appreciated by persons skilled in the art that that the effects that could be achieved with the present disclosure are not limited to what has been particularly described hereinabove and other advantages of the present disclosure will be more clearly understood from the detailed description.

Although the exemplary embodiments of the present disclosure have been described above with reference to the accompanying drawings, those skilled in the art will appreciate that the present disclosure can be implemented in various other embodiments without changing the technical ideas or features thereof.

What is claimed is:

1. A system for charging a battery of a seat, comprising:
a seat battery installed in the seat movable on a seat rail;
a charge connector that is installed on the seat rail and is electrically connected to the seat battery to supply power of a vehicle battery to the seat battery when the seat is moved to a charge position, the charge connector being electrically disconnected from the seat battery when the seat is not in the charge position; and
a controller configured to control a position of the seat, to receive information on a state of charge of the seat battery, and to move the seat to the charge position to electrically connect the seat battery and the charge connector to each other when the state of charge of the seat battery is less than or equal to a preset capacity.

2. The system of claim 1, wherein the seat battery and the controller are installed in a housing disposed below the seat and configured as one integrated module.

3. The system of claim 2, wherein a battery connector that is electrically connected to the seat battery is included in the housing, and is positioned to be electrically connected to the charge connector when the seat is moved forward or backward to a respective maximum seat position on the seat rail.

4. The system of claim 3, wherein the charge connector is positioned to be connected to the battery connector when the seat is moved forward or backward to the respective maximum seat position on the seat rail.

5. The system of claim 1, wherein the controller additionally receives information on whether a passenger sits on the seat, and performs a control to move the seat to the charge position when the state of charge of the seat battery is less than or equal to the preset capacity and the passenger does not sit on the seat.

6. The system of claim 5, wherein the controller determines whether the state of charge of the seat battery is less than or equal to a preset capacity limit when the passenger sits on the seat, and performs control to move the seat to the charge position when the state of charge of the seat battery is less than or equal to the preset capacity limit.

7. The system of claim 6, wherein, when controlling the seat to be moved to the charge position as the state of charge of the seat battery is less than or equal to the preset capacity limit, the controller transmits a warning message or a warning sound to the passenger through a warning transmitter.

8. The system of claim 6, wherein, when the state of charge of the seat battery is greater than the preset capacity limit while the passenger sits on the seat, the controller performs control to move the seat to the charge position upon receiving a charge command based on manipulation of a manipulator of the passenger.

9. The system of claim 1, wherein the controller additionally receives information on the position of the seat and information on whether the battery of the vehicle is charged, and
when the battery of the vehicle is not charged and the seat is positioned at the charge position, the controller sets a limit to charge the seat battery by a preset state of charge.

10. The system of claim 9, wherein, when the battery of the vehicle is charged and the seat is positioned at the charge position, the controller fully charges the seat battery.

* * * * *